United States Patent [19]

Spector

[11] Patent Number: 4,692,590
[45] Date of Patent: Sep. 8, 1987

[54] AROMA-GENERATING AUTOMOBILE CIGARETTE LIGHTER

[76] Inventor: Donald Spector, 380 Mountain Rd., Union City, N.J. 07087

[21] Appl. No.: 918,141

[22] Filed: Oct. 14, 1986

Related U.S. Application Data

[63] Continuation-in-part of Ser. No. 835,223, Mar. 3, 1986, which is a continuation-in-part of Ser. No. 658,778, Oct. 9, 1984, Pat. No. 4,574,181.

[51] Int. Cl.⁴ .......................... F22B 1/28; A61L 9/03; F23Q 7/00
[52] U.S. Cl. .................................... 219/275; 219/274; 219/260
[58] Field of Search ............... 219/271, 272, 273, 274, 219/275, 276, 260, 263, 264, 265, 267; 422/305, 306, 125; 239/135, 136, 44, 47, 51.5, 53, 54, 55, 56, 57, 58, 59, 60

[56] References Cited

U.S. PATENT DOCUMENTS

| | | | |
|---|---|---|---|
| 2,505,326 | 4/1950 | Jackson | 219/264 |
| 3,006,042 | 10/1961 | Calandra | 219/276 |
| 3,551,092 | 12/1970 | Masson | 219/267 |
| 4,574,181 | 3/1986 | Spector | 219/276 |

FOREIGN PATENT DOCUMENTS 373184 11/1963 Switzerland ....................... 219/260

2062199 5/1981 United Kingdom ............... 219/274

Primary Examiner—E. A. Goldberg
Assistant Examiner—Teresa J. Walberg
Attorney, Agent, or Firm—Michael Ebert

[57] ABSTRACT

An aroma-generating cigarette lighter insertable into a dashboard socket having terminals connected to the vehicle battery. The lighter includes a cylindrical case that fits into the socket. Telescoped within the case is a spring-biased hollow plunger that has a heater unit attached to its front end and a center bore at its rear end. When the lighter is inactive, the heater unit lies within the case; but when the lighter is activated by pressing in the plunger, the heater unit is advanced from the case and its contacts then engage the socket terminals to effect energization of the unit. A hollow cylindrical cartridge whose diameter is less than the internal diameter of the case is coupled to the rear end of the plunger, the front end of the cartridge being provided with a hollow plug that is threadably received in the end bore of the plunger. Supported within the cartridge is a porous wafer impregnated with a volatile liquid fragrance. A thermally conductive rod is secured to the center of the heater unit and extends through the hollow plug into the hollow cartridge to supply heat to the wafer to promote volatilization of the liquid, thereby producing an aromatic vapor that is discharged into the atmosphere.

6 Claims, 6 Drawing Figures

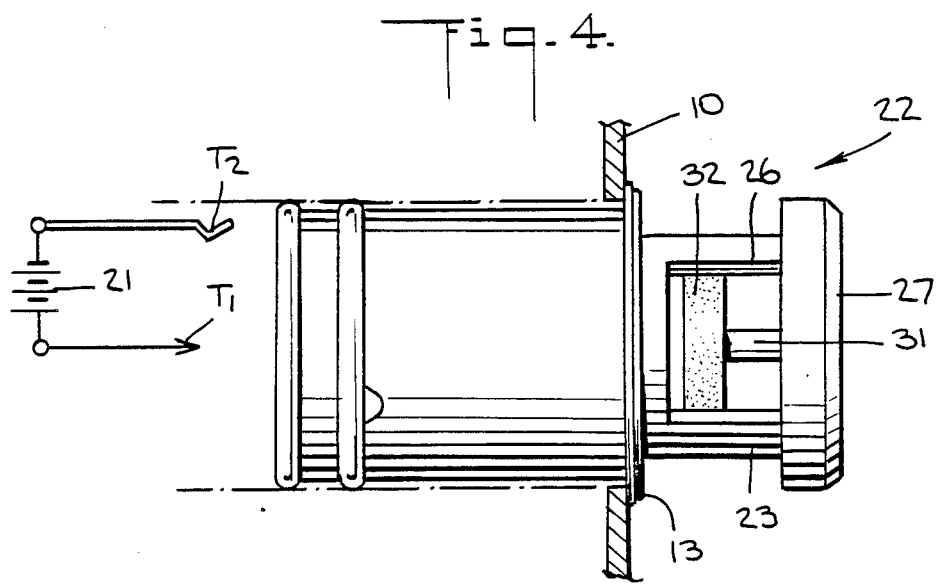
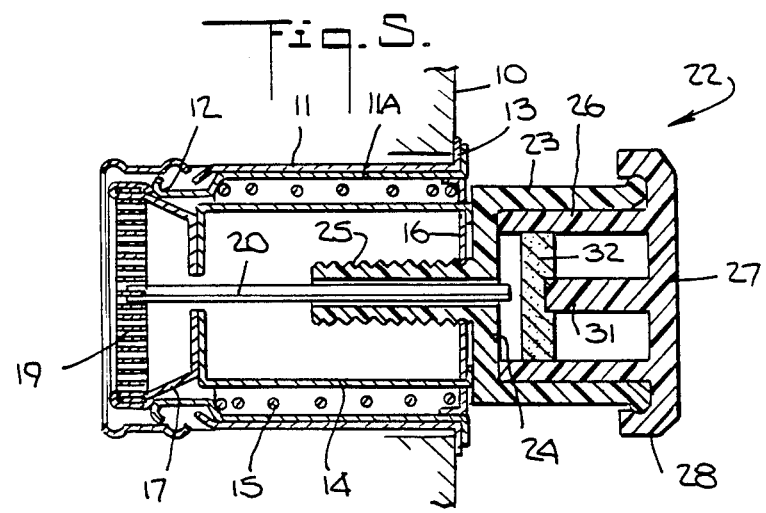
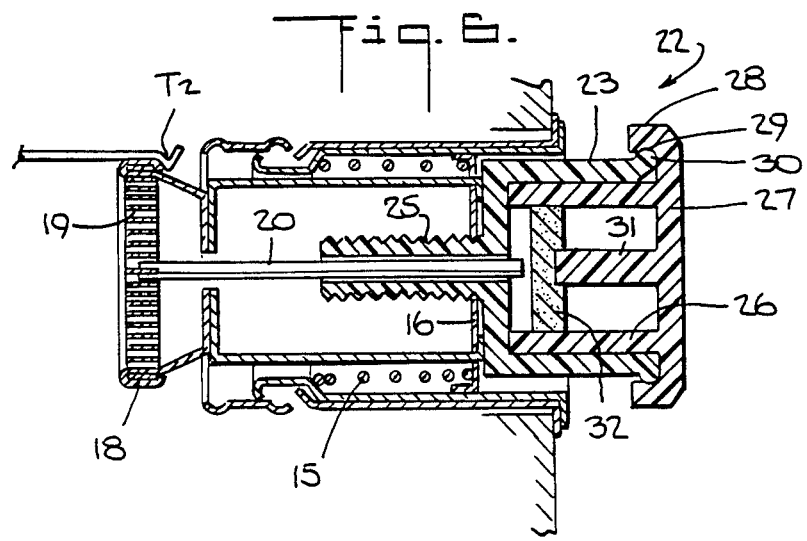

વ4,692,590

AROMA-GENERATING AUTOMOBILE CIGARETTE LIGHTER

RELATED APPLICATION

This application is a continuation-in-part of my copending patent application Ser. No. 835,223, filed Mar. 3, 1986, which in turn is a C-I-P of my application Ser. No. 658,778, filed Oct. 9, 1984, entitled "Aroma-Generating Automobile Cigarette Lighter" (now U.S. Pat. No. 4,574,181), whose entire disclosures are incorporated herein by reference.

BACKGROUND OF THE INVENTION

1. Field of Invention

This invention relates generally to a cigarette lighter adapted to also function as an aroma generator and more particularly to a lighter of this type provided with a replaceable heat-responsive fragrance cartridge component which gives off an aromatic vapor that is discharged into the interior of the vehicle when the lighter is activated by the user.

2. Status of Art

As used herein, the term "aroma" is not limited to pleasant or savory smells but encompasses scents that function as air fresheners, deodorants or any other odor that acts to condition, modify or otherwise change the atmosphere.

The aroma of perfumes and perfume-based products such as colognes and toilet waters was originally derived from the essential oils of plants. However, since the early 19th century, chemists have succeeded in analyzing many essential oils and in creating thousands of synthetics, some simulating natural products and others yielding altogether new scents. Perfumes today are largely blends of natural and synthetic scents and of fixatives which equalize vaporization and enhance pungency. In most liquid scents, the ingredients are combined with alcohol.

Various types of spray devices or dispensers are known for emitting aromas. Thus the patent to Dearling, U.S. Pat. No. 3,330,481, discloses a dispenser for wafting into the atmosphere an insecticide, a pleasant smelling scent or any other aroma, this being accomplished by means of a pressurized container. When the actuating button of this container is pressed, a dispersant is released onto an absorbent material, the absorbent dispersant permeating the atmosphere.

None of these prior art devices is particularly adapted for use in an automotive interior, an environment having special requirements. The atmosphere in most automobiles is somewhat unpleasant, for it is often permeated by exhaust and engine fumes, by odors emanating from the road, and in many cases by tobacco smoke. Hence, it becomes desirable to mask or supplant these odors by more agreeable scents.

While a perfume odor may be desirable in a vehicle, inasmuch as personal tastes differ and the choice of fragrance may also depend on other variables, the availability of an aroma dispenser providing a single scent falls short of what is required. Moreover, in some instances the aroma called for is not a perfume but a scent acting as a stimulant to keep the driver awake under driving conditions that may be soporific. Thus the type of pleasing scent that may be appropriate for a morning drive is usually not the same as that suitable for dusk; whereas when driving late at night, what may then be desirable is an odor which, though perhaps unpleasant, functions to stimulate and awaken rather than relax the driver.

My prior U.S. Pat. No. 4,200,229 discloses an aroma-dispenser which is mountable under the dashboard of an automobile and takes the form of a replaceable cartridge receivable in a stationary holder so that the user can insert therein whichever cartridge gives off an aroma suitable for a given occasion or satisfying a personal preference. The cartridge, in this instance, includes a bottle containing a liquid scent and a hand-operated suction pump which when actuated serves to spray a liquid scent into the car interior. The Mangels U.S. Pat. No. 2,271,098 is also concerned with the disagreeable nature of tobacco smoke and other fumes permeating automobile interiors, and provides a deodorizer structure that is mountable in the vehicle.

The typical automobile is equipped with a cigarette lighter releasably held in a dashboard socket. In order for the driver or passenger in a front seat of the vehicle to light up, he must press the knob of the lighter. This action causes a spring-biased plunger having a disc-shaped heater unit at its front end to advance and to bring the heater contacts into engagement with terminals connected to the car battery, thereby energizing the heater and causing it to glow. The plunger is retained in its advanced position by a bimetallic latching element; but when the heat produced by the heater reaches a predetermined temperature level, the latching element disengages the plunger which returns to its normal position. Though the heater is then deactivated, it has a relatively high heat capacity and continues to glow so that when the user withdraws the lighter from the dashboard socket, he can then light his cigarette from the still glowing heater.

In my related applications, above-identified, there are disclosed various embodiments of an automobile cigarette lighter which, when operated by the user, generates an aromatic vapor which is exuded into the interior of the vehicle. These lighters includes a heat-responsive fragrance element which when the lighter is activated discharges an aromatic vapor. The present invention works on the same principle as the lighters disclosed in my related applications but having certain practical advantages thereover.

It is known in the patent to Masson, U.S. Pat. No. 3,551,092, to provide a cigarette lighter that includes a chamber into which one can insert a pellet of aromatic material. But since this pellet is remote from the electrical heater unit, it is not an efficient aroma generator. The present invention makes more efficient use of the heat from the heater unit of an automobile cigarette lighter.

SUMMARY OF THE INVENTION

In view of the foregoing, the main object of this invention is to provide an automobile cigarette lighter which when operated by the user, generates an aromatic vapor which is exuded into the interior of the vehicle, the light including a replaceable heat-responsive fragrance cartridge component to which heat is supplied from the heater unit.

A significant feature of the invention lies in the fact that the cartridge is rendered effective only in the interval during which the heater unit is hot, this relatively short interval being predetermined by the characteristics of the heater structure. Hence each time the lighter is pressed in, a limited dosage of aromatic vapor is generated. In this way, the user can avoid an excessive concentration of fragrance within the confines of the vehicle; and by intermittently pressing in the lighter to activate the heater, the user can maintain whatever concentration is desired.

Also an object of this invention is to provide an aroma-generating cigarette lighter which is also fully capable of functioning as an ignition source for cigarettes, so that the lighter may be used either to light a cigarette or to generate a pleasing aroma.

Yet another object of the invention is to provide a cartridge from a cigarette lighter having a replaceable component containing a wafer impregnated with a volatile aromatic liquid, which component may be readily replaced when the wafer is exhausted.

Briefly stated, these objects are attained in an aroma-generating cigarette lighter insertable into a dashboard socket having terminals connected to the vehicle battery. The lighter includes a cylindrical case that fits into the socket. Telescoped within the case is a spring-biased hollow plunger that has a heater unit attached to its front end and a center bore at its rear end. When the lighter is inactive, the heater unit lies within the case; but when the lighter is activated by pressing in the plunger, the heater unit is advanced from the case and its contacts then engage the socket terminals to effect energization of the unit. A hollow cylindrical cartridge whose diameter is less than the internal diameter of the case is coupled to the rear end of the plunger, the front end of the cartridge being provided with a hollow plug that is threadably received in the end bore of the plunger. Supported within the cartridge is a porous wafer impregnated with a volatile liquid fragrance. A thermally conductive rod is secured to the center of the heater unit and extends through the hollow plug into the hollow cartridge to supply heat to the wafer to promote volatilization of the liquid, thereby producing an aromatic vapor that is discharged into the atmosphere.

OUTLINE OF DRAWINGS

For a better understanding of the invention as well as other objects and further features thereof, reference is made to the following detailed description to be read in conjunction with the accompanying drawings, wherein:

FIG. 4 is a side view of the lighter in its inactive state;

FIG. 5 is a longitudinal section taken through the lighter in its inactive state; and FIG. 6 is a longitudinal section taken through the lighter in its activated state.

DESCRIPTION OF INVENTION

Figure 1:
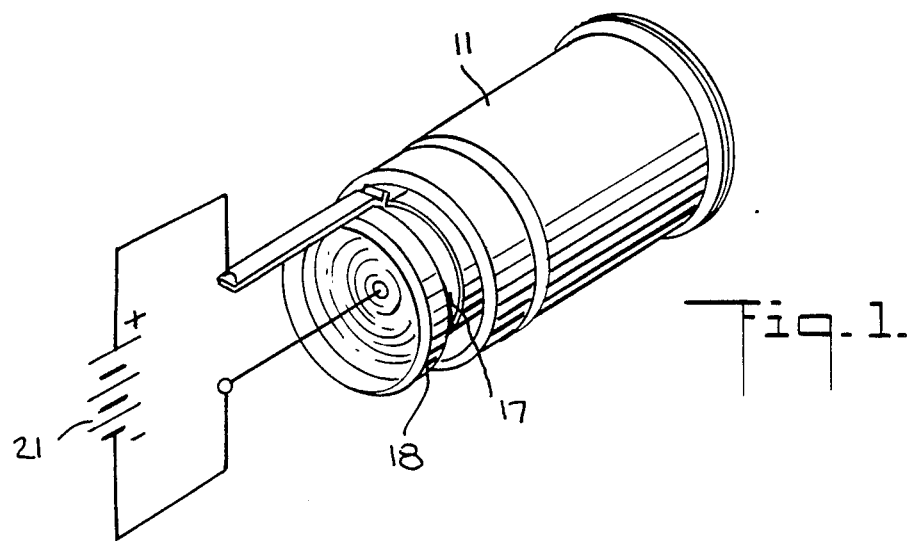
FIG. 1 is a perspective view of an aroma-generating cigarette lighter in accordance with the invention shown in its activated state in which the contacts of the electrical heater unit included in the lighter are engaged by terminals connected to the battery of a vehicle.
Figure 3:
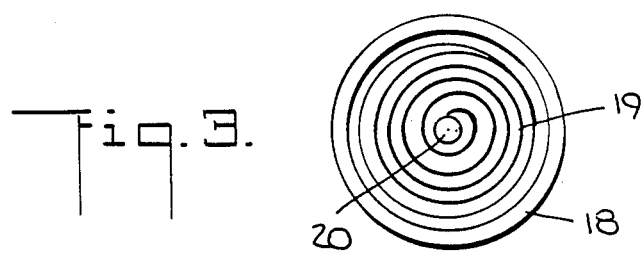
FIG. 3 is a front view of the electrical heater unit.

Referring now to FIGS. 1 and 4, a lighter in accordance with the invention is receivable in a standard cylindrical socket indicated by dashed line S formed in the dashboard 10 of a vehicle. The lighter includes a cylindrical metal case 11 which fits into the socket. Case 11, as best seen in FIG. 5, is provided with an inner liner 11A whose front end is shaped to form an annular turned-in ledge 12. The outer ends of case 11 and liner 11A are turned out to define a flange 13 that surrounds the opening of the socket in dashboard 10 and rests against the surface of the dashboard.

Telescoped within case 11 is a spring-biased plunger 14 formed from a cylindrical metal shell. The spring bias for the plunger is provided by a helical spring 15 that surrounds shell 14 in the annular space between the shell and inner liner 11A, the spring being interposed between the rear end of ledge 12 and the rear end of closure plate 16 of plunger 14.

Attached to the closed front end of plunger 14 by means of a conical spacer 17 of ceramic or other material is a heater unit constituted by a cup-shaped metal bezel 18 within which is nested a spiral strip 19 of electrical resistance material. In the inactive state of the lighter, bezel 18 rests against ledge 12. The inner end of the spiral is connected to a central electrode rod 20 which projects into the front end of plunger shell 14 through spacer 17. The outer end of the spiral is connected to metal bezel 18. Hence, to energize the heater, a voltage must be applied between electrode 20 and bezel 18. The heater unit is designed to operate at the voltage of an automobile storage battery.

When the plunger is pressed in by a user, the electrical heater unit is projected from the front end of case 11 and is advanced until the center electrode 20 of the unit is engaged by a socket terminal $T_1$ and bezel 18 of the unit is engaged by a latching terminal $T_2$ which acts, as shown in FIGS. 1 and 6, to retain the projected plunger in its activated position within the dashboard socket.

Terminals $T_1$ and $T_2$ are connected to opposite poles of car battery 21, as a consequence of which the electrical heater element 19 is energized and is caused to heat up and glow. Since the heater unit is attached to the closed front end of metal plunger shell 14 and is in heat exchange relationship therewith, the heat is transferred by conduction through insulator 17 to the interior of shell 14. This transference is enhanced by the heat-conducting electrode rod 20 which extends into the interior of the shell.

When the temperature of the heater rises to a predetermined level, latching terminal $T_2$ which is formed of a bimetallic thermostatic material, deforms or bends to an extent releasing bezel 18. As a result, helical spring 15, which is compressed when the plunger is pressed in, expands to return the plunger to its normal inactive state, in which position, as shown in FIG. 4, terminals $T_1$ and $T_2$ are disengaged.

The heater has a substantial heat capacity and remains glowing for a few seconds after it is disconnected from the battery for a period sufficient to permit the user, if he wishes, to remove the lighter from the dashboard socket and light up a cigarette. However, if the lighter is not removed from the socket and has a fragrance cartridge inserted therein, to be later explained, then heat from the heater in the period during which it is energized and in the post-energization interval in which it remains hot, acts to volatilize the aromatic liquid in the cartridge to produce an aromatic vapor which is vented into the automobile interior.

Figure 2:
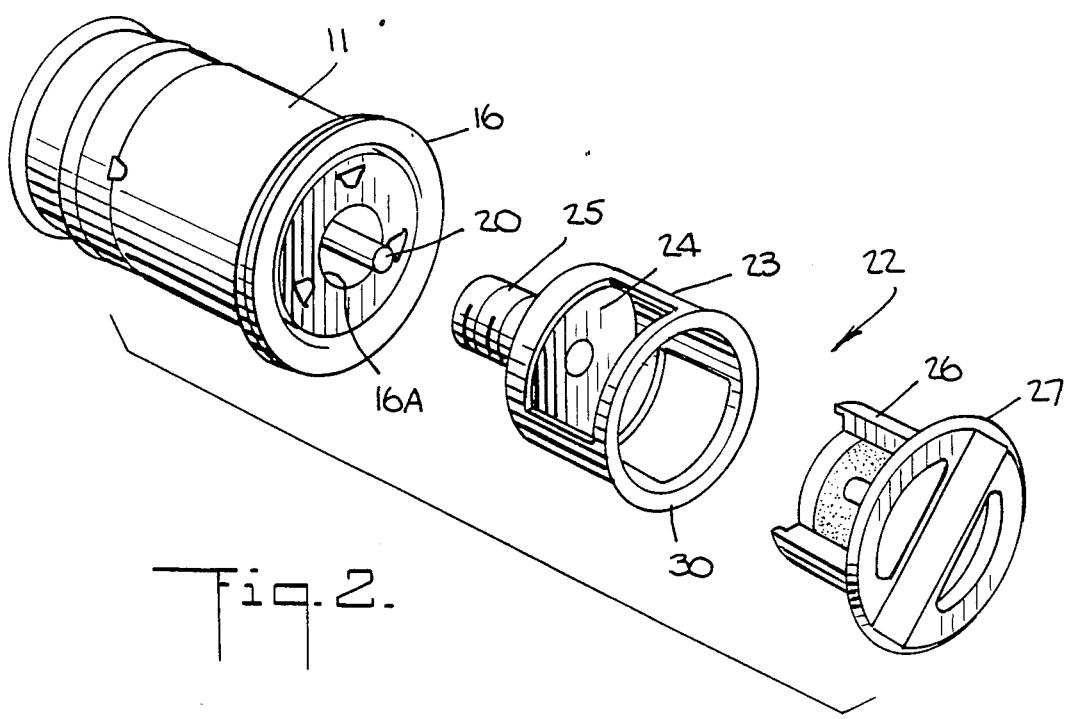
FIG. 2 is an exploded view of the lighter.

As best seen in FIG. 2, the fragrance cartridge, generally identified by numeral 22, is molded of synthetic plastic material and is formed of two components, one being constituted by an outer cylindrical cage 23. Cage 23 has a disc-shaped base 24 from whose central opening is projected an externally threaded plug 25 which, as best seen in FIG. 5, is threadably received in the center bore 16A of the end closure plate 16 of plunger 14 (see FIGS. 2 and 5). The outer diameter of cartridge 22 is somewhat less than the inner diameter of the case; hence when the lighter is activated, the cartridge moves partially into the case.

Fitting snugly into outer cage 23 of the cartridge is the second component thereof which is an inner cage 26 whose front end is open and whose rear end is formed by a cap-shaped enlarged knob 27 whose outer rim 28 is provided with an internal groove 29. Snap-fitting in groove 29 is the circular bead 30 at the rear end of outer cage 23 so that the two components snap fit together, thereby making it possible to separate the components when necessary to do so.

Supported within inner cage 26 on a center stem 31 projecting from the inner surface of knob 27 is a wafer 32. This wafer, which may be formed of porous synthetic material or of ceramic is highly absorbent and is impregnated with a volatile aromatic liquid having a given fragrance.

The length of electrode rod 20 is such that it passes through hollow plug 25 into the interior of cartridge 22 to a point adjacent wafer 32. Rod 20 is formed of a metal such as copper or steel that is highly conductive thermally, so that when the cigarette lighter is activated, heat from the heater unit is transferred by rod 20 into the cartridge to supply heat to the wafer to promote volatilization of the liquid.

Hence each time the cigarette lighter is activated, the resultant heat from the heater unit is quickly transferred to the wafer to effect volatilization of the aromatic liquid for a brief period, the resultant aromatic vapor being discharged through the vents of the cage-like cartridge into the interior of the vehicle. When the wafer is exhausted, as will occur after many repeated uses of the lighter, it is a simple matter to snap off the inner cage of the cartridge which contains the wafer and replace it with a cage having a fresh wafer. The user may be supplied with an inventory of inner cages having different aromas, so that he can select a preferred aroma.

While there has been shown and described a preferred embodiment of an aroma-generating automobile cigarette lighter in accordance with the invention, it wil be appreciated that many changes and modifications may be made therein without, however, departing from the essential spirit thereof.

I claim:

1. A cigarette lighter adapted to function also as an aroma generator, the lighter being insertable into a socket having terminals which are connected to a power source, one of which is a latching bi-metallic element, said lighter comprising:

A. a cylindrical case that fits into the socket;

B. a spring-biased hollow plunger formed from a cylindrical shell telescopically received in the case, said plunger being provided with a rear end closure plate having a center hole therein;

C. an electrical heater unit attached to the front end of the shell and which in the inactive state of the plunger lies within the case, the unit having a center contact and an outer contact, whereby when a user presses in the plunger to activate the lighter, the contacts are engaged by the socket terminals to energize the unit and the unit is then latched by the latching element which engages the outer contact, the resultant heat also acting to deform the latching element, thereby disengaging the terminals and causing the released plunger to return to its inactive state;

D. a cylindrical cage secured to the rear of the plunger and having an outer cage diameter somewhat smaller than the inner diameter of said case, said cage being provided at its base with a hollow plug that projects into the center hole in the rear end closure plate of the plunger;

E. a hollow cylindrical cartridge insertable into said cage and supporting a heat-responsive, aroma-generating element that is activated by heat to exude an aromatic vapor; and F. a thermally conductive electrode rod forming the center contact of the unit and extending through the plunger and the hollow plug into the hollow cartridge to a point adjacent said element to transfer heat thereto when the lighter is activated.

2. A lighter as set forth in claim 1, wherein said heater unit is formed by a cup-shaped bezel and a spiral strip of electrical resistance material nested in the bezel, one end of the strip being connected to the bezel which is engaged by the latching terminal, the other end of the strip being connected to said electrode rod that is engaged by the other terminal.

3. A lighter as set forth in claim 1, wherein said element is constituted by an absorbent wafer supported within the cartridge and impregnated with a volatile aromatic fluid.

4. A lighter as set forth in claim 3, wherein said inner component is provided with a cap-like rear closure that functions as the knob of the lighter.

5. A lighter as set forth in claim 4, wherein said closure has an internal circular groove which receives a circular bead at the rear of the outer component to provide a snap fit.

6. A lighter as set forth in claim 1, wherein said rod is formed of copper.

* * * * *